(12) United States Patent
Piche

(10) Patent No.: US 7,123,971 B2
(45) Date of Patent: Oct. 17, 2006

(54) NON-LINEAR MODEL WITH DISTURBANCE REJECTION

(75) Inventor: Stephen Piche, Austin, TX (US)

(73) Assignee: Pegasus Technologies, Inc., Austin, TX (US)

( * ) Notice: Subject to any disclaimer, the term of this patent is extended or adjusted under 35 U.S.C. 154(b) by 27 days.

(21) Appl. No.: 10/982,139

(22) Filed: Nov. 5, 2004

(65) Prior Publication Data
US 2006/0100721 A1    May 11, 2006

(51) Int. Cl.
G05B 11/01 (2006.01)
G05B 13/02 (2006.01)
G06F 15/18 (2006.01)
G06E 1/00 (2006.01)
G06E 3/00 (2006.01)
G06G 7/00 (2006.01)

(52) U.S. Cl. ............... 700/19; 700/20; 700/28; 700/44; 700/45; 706/14; 706/16; 706/19; 706/21; 709/201; 709/208; 702/181

(58) Field of Classification Search ............ 700/28–34, 700/44, 45, 47, 19–20; 702/181; 706/14, 706/16, 19, 21; 382/159–161; 709/201, 709/208
See application file for complete search history.

(56) References Cited

U.S. PATENT DOCUMENTS

| | | | |
|---|---|---|---|
| 5,167,009 A | 11/1992 | Skeirik | |
| 5,353,207 A | 10/1994 | Keller et al. | |
| 5,386,373 A | 1/1995 | Keeler et al. | |
| 5,408,406 A | 4/1995 | Mathur et al. | |
| 5,559,690 A * | 9/1996 | Keeler et al. | 700/44 |
| 5,933,345 A | 8/1999 | Martin et al. | |
| 6,047,221 A * | 4/2000 | Piche et al. | 700/44 |
| 6,278,899 B1 | 8/2001 | Piche et al. | |
| 6,725,208 B1 | 4/2004 | Hartman et al. | |
| 6,950,711 B1 * | 9/2005 | Havener et al. | 700/28 |
| 6,985,781 B1 * | 1/2006 | Keeler et al. | 700/44 |
| 2003/0014131 A1 * | 1/2003 | Havener et al. | 700/29 |
| 2003/0078683 A1 | 4/2003 | Hartman et al. | |
| 2005/0236004 A1 * | 10/2005 | Magnuson et al. | 128/898 |

OTHER PUBLICATIONS

Steepest descent algorithms for neural network controllers and filters; Piche, S.W.; Neural Networks, IEEE Transactions on □□vol. 5, Issue 2, Mar. 1994 pp. 198-212, Digital Object Identifier 10.1109/72.279185.*

The selection of weight accuracies for Madalines; Piche, S.W.; Neural Networks, IEEE Transactions on vol. 6, Issue 2, Mar. 1995 pp. 432-445, Digital Object Identifier 10.1109/72.363478.*

(Continued)

Primary Examiner—Ramesh Patel
(74) Attorney, Agent, or Firm—Howison & Arnott, L.L.P.

(57) ABSTRACT

Non-linear model with disturbance rejection. A method for training a non linear model for predicting an output parameter of a system is disclosed that operates in an environment having associated therewith slow varying and unmeasurable disturbances. An input layer is provided having a plurality of inputs and an output layer is provided having at least one output for providing the output parameter. A data set of historical data taken over a time line at periodic intervals is generated for use in training the model. The model is operable to map the input layer through a stored representation to the output layer. Training of the model involves training the stored representation on the historical data set to provide rejection of the disturbances in the stored representation.

10 Claims, 6 Drawing Sheets

OTHER PUBLICATIONS

A disturbance rejection based neural network algorithm for control of air pollution emissions; Piche, S.; Sabiston, P.; Neural Networks, 2005. IJCNN '05. Proceedings. 2005 IEEE International Joint Conference on vol. 5, Jul. 31-Aug. 4, 2005 pp. 2937-2941.*

Automated generation of models for inferential control; Piche, S.; American Control Conference, 1999. Proceedings of the 1999, vol. 5, Jun. 2-4, 1999 pp. 3125-3126 vol. 5, Digital Object Identifier 10.1109/ACC.1999.782339.*

Trend visualization; Piche, S.W.; Computational Intelligence for Financial Engineering, 1995.,Proceedings of the IEEE/IAFE 1995, Apr. 9-11, 1995 pp. 146-150, Digital Object Identifier 10.1109/CIFER.1995.495268.*

Robustness of feedforward neural networks; Piche, S.; Neural Networks, 1992. IJCNN., International Joint Conference on☐☐vol. 2, Jun. 7-11, 1992 pp. 346-351 vol. 2, Digital Object Identifier 10.1109/IJCNN.1992.226963.*

The second derivative of a recurrent network; Piche, S.W.; Neural Networks, 1994. IEEE World Congress on Computational Intelligence., 1994 IEEE International Conference on, vol. 1, Jun. 27-Jul. 2, 1994 pp. 245-250 vol. 1, Digital Object Identifier 10.1109/ICNN.1994.374169.*

"Models of Linear Time-Invariant Systems", Ljung, L., System Identificatiaons: Theory for the User, Chapter 4, Prentice Hall, Englefwood Cliffs, NJ, 1987.

"Modeling Chemical Process Systems via Neural Computation", Bhat, N., Minderman, P., McAvoy, T., and Wang, N., IEEE Control Systems Magazine, pp. 24-30, Apr. 1990.

"Connectionist Learning for Control", Barto, A., Neural Network for Control, edited by Miller, W., Sutton, R. and Werbos, P., MIT Press, pp. 5-58, 1990.

"Disturbance Rejection in Non-Linear Systems using Neural Networks", Mukhopadhyay, S. and Narendra, K., IEEE Transactions on Neural Networks, vol. 4, No. 1, pp. 63-72, 1993.

"Steepest Descent Algorithms for Neural Network Controllers and Filter", Piche, S., IEEE Transactions on Neural Ntworks, vol. 5, No. 2, Mar. 1994.

"Non-Linear Model Predictive Control using Neural Networks", Piche, S., Sayyar-Rodsari, Johnson, D., and Gerules, M., IEEE Control Systems Magazine, vol. 20, No. 3, Jun. 2000.

"Support Vector Machines; a Non-Linear Modeling and Control Perspective", Suykens, L., Technical Report, Katholieke Universiteit Leuven, Apr. 2001.

"Robust Redesign of a Neural Network Controller in the Presence of Unmodeled Dynamics", G. Rovithakis, IEEE Trans. On Neural Networks, vol. 15, No. 6, aa 1482-1490, 2004.

* cited by examiner

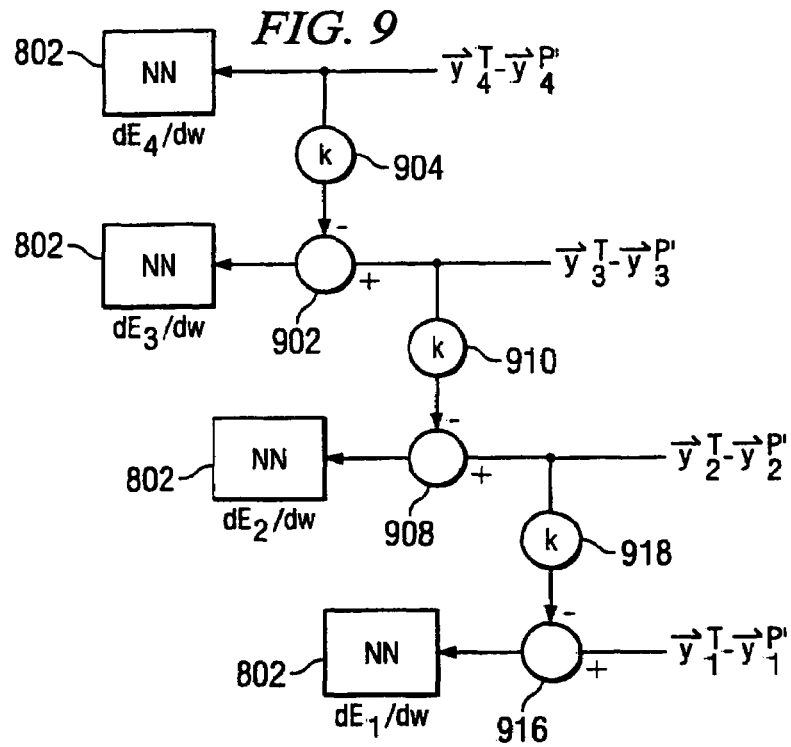
*FIG. 9*
*FIG. 11*
| PAIRS | FLAG |
|---|---|
| $\vec{u}_1, \vec{y}_1$ | 0 |
| $\vec{u}_2, \vec{y}_2$ | 1 |
| ... | ... |
| $\vec{u}_8, \vec{y}_8$ | 1 |
| $\vec{u}_9, \vec{y}_9$ | 0 |
*FIG. 10*
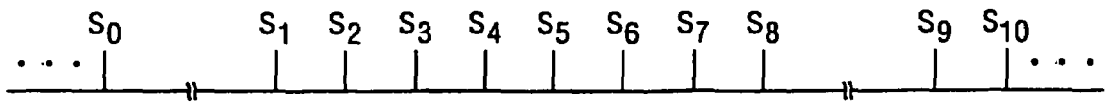

NON-LINEAR MODEL WITH DISTURBANCE REJECTION

TECHNICAL FIELD OF THE INVENTION

The present invention pertains in general to non-linear models and, more particularly, to a non-linear model that is trained with disturbance rejection as a parameter.

CROSS REFERENCE TO RELATED APPLICATION

N/A.

BACKGROUND OF THE INVENTION

Non-linear models have long been used for the purpose of predicting the operation of a plant or system. Empirical nonlinear models are trained on a historical data set that is collected over long periods of time during the operation of the plant or system. This historical data set only covers a limited portion of the "input space" of the plant, i.e., only that associated with data that is collected within the operating range of the plant when the data was sampled. The plant or system typically has a set of manipulatable variables (MV) that can be controlled by the operator. There are also some variables that are referred to as "disturbance variables" (DV) which are variables that cannot be changed by the operator, such as temperature, humidity, fuel composition, etc. Although these DVs have an affect on the operation of the plant or system, they cannot be controlled and some can not be measured. The plant will typically have one or more outputs that are a function of the various inputs, the manipulatable variables and the disturbance variables. These outputs are sometimes referred to as "controlled variables" (CVs). If the historical data set constitutes a collection of the measured output values of the plant/system and the associated input values thereto, a non-linear network can be trained on this data set to provide a training model that can predict the output based upon the inputs. One type of such non-linear model is a neural network that is comprised of an input layer and an output layer with a hidden layer disposed there between, which hidden layer stores a representation of the plant or system, wherein the input layer is mapped to the output layer through the stored representation in the hidden layer. Another is a support vector machine (SVM). These are conventional networks. However, since the unmeasurable disturbances cannot be measured, the model can not be trained on these variables as a discrete input thereto; rather, the data itself embodies these errors.

One application of a non-linear model is that associated with a control system for controlling a power plant to optimize the operation thereof in view of desired output variables. One output variable that is of major concern in present day power plants is nitrogen oxide (NOx). Nitrogen oxides lead to ozone formation in the lower atmosphere which is a measurable component of urban photochemical smog, acid rain, and human health problems such as lung damage and people with lung disease. NOx levels are subject to strict guidelines for the NOx emissions throughout the various industrialized areas of the country. For example, the current U.S. administration has proposed legislation to reduce NOx emissions from power plants by 50% over the next decade.

These Nitrogen oxides are formed during combustion and emitted into the atmosphere as a component of the exit flue gas. The level of NOx formation is dependent upon the local fuel/air stochiometric ratio in the furnace of a coal fired plant, as well as the amount of nitrogen in the fuel. A fuel rich environment (high fuel/air stochiometric ratio) leads to low NOx formation but high carbon monoxide (CO) amounts, another regulated gas. Therefore, an optimal fuel/air ratio needs to be determined to minimize NOx while maintaining CO below a specified constraint. In a coal fired plant, both fuel and air are input into the furnace at multiple points. Furthermore, a non-linear relationship between fuel and air inputs and NOx formation has been observed, such that optimization of the NOx levels, while observing the CO constraint, requires a non-linear, multiple input, multiple output (MIMO) controller. These optimizers typically utilize a nonlinear neural network model, such as one that models NOx formation, such that prediction of future set points for the purpose of optimizing the operation of the plant or system is facilitated given a cost function, constraints, etc.

As noted herein above, to develop accurate models for NOx, it is necessary to collect actual operating data from the power plant over the feasible range of operation. Since plants typically operate in a rather narrow range, historical data does not provide a rich data set over a large portion of the input space of the power plant for developing empirical models. To obtain a valid data set, it is necessary to perform a series of tests at the plan. Each test involves initially moving approximately five to ten inputs of the furnace to a designated set point. This set point is then held for 30–60 minutes until the process has obtained a stable steady state value. This is due to the fact that the desired nonlinear model is a steady state model. At that time, the NOx and input set points are recorded, this forming a single input-output pattern in the historical data set. It may take two engineers three to four weeks of round-the-clock testing to collect roughly 200–400 data points needed to build a model.

The training of the model utilizes a standard feed-forward neural network using a steepest descent approach. Since only data from steady state data points are used, the model is an approximation of the steady state mapping from the input to the output. Utilizing a standard back propagation approach, the accuracy of the model is affected by the level of the unmeasured disturbance inherent to any process. Because the major source of nitrogen for the formation of NOx in a combustion process at coal fired plants is the fuel, variations in the amount of nitrogen in the coal can cause slow variations in the amount of NOx emissions. Furthermore, most power plants do not have on-line coal analysis instruments needed to measure the nitrogen content of the coal. Thus, the variation of nitrogen content along with other constituents introduces a significant, long-term, unmeasured disturbance into the process that affects the formation of NOx.

SUMMARY OF THE INVENTION

The present invention disclosed and claimed herein, in one aspect thereof, comprises a method for training a non linear model for predicting an output parameter of a system that operates in an environment having associated therewith slow varying and unmeasurable disturbances. An input layer is provided having a plurality of inputs and an output layer is provided having at least one output for providing the output parameter. A data set of historical data taken over a time line at periodic intervals is generated for use in training the model. The model is operable to map the input layer through a stored representation to the output layer. Training of the model involves training the stored representation on the historical data set to provide rejection of the disturbances in the stored representation.

BRIEF DESCRIPTION OF THE DRAWINGS

Further features and advantages will be apparent from the following and more particular description of the preferred and other embodiments of the invention, as illustrated in the accompanying drawings in which like reference characters generally refer to the same parts or elements throughout the views, and in which:

FIG. 9 illustrates the portion of the training utilizing the back propagation of the error through the network;

FIG. 10 illustrates a time line for taking data from the plant or system;

FIG. 11 illustrates the manner in which the data is handled during training;

DETAILED DESCRIPTION OF THE INVENTION

Figure 1:
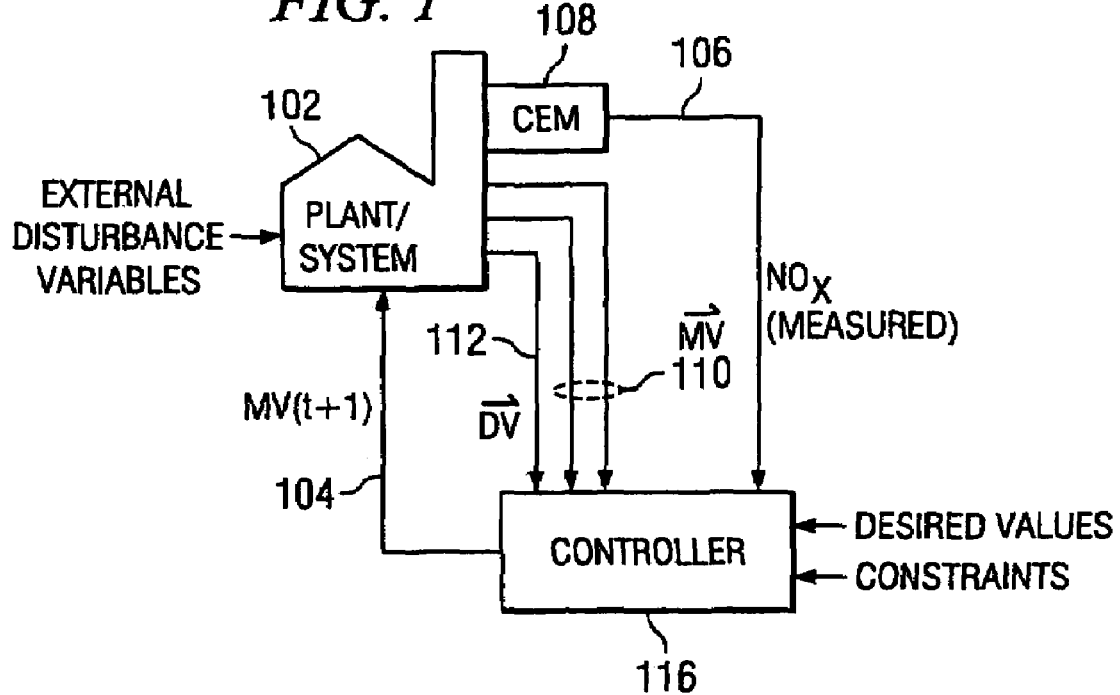
FIG. 1 illustrates an overall diagram of a plant utilizing a controller with the trained model of the present disclosure.

Referring now to FIG. 1, there is illustrated a diagrammatic view of a plant/system 102 which is operable to receive a plurality of control inputs on a line 104, this constituting a vector of inputs referred to as the vector MV(t+1) which constitutes a plurality of manipulatable variables (MV) that can be controlled by the user. In a coal-fired plant, for example, the burner tilt can be adjusted, the amount of fuel supplied can be adjusted and oxygen content can be controlled. There, of course, are many other inputs that can be manipulated. The plant/system 102 is also affected by various external disturbances that can vary as a function of time and these affect the operation of the plant/system 102, but these external disturbances can not be manipulated by the operator. In addition, the plant/system 102 will have a plurality of outputs (the controlled variables), of which only one output is illustrated, that being a measured NOx value on a line 106. (Since NOx is a product of the plant/system, it constitutes an output controlled variable). This NOx value is measured through the use of a Continuous Emission Monitor (CEM) 108. This is a conventional device and it is typically mounted on the top of an exit flue. The control inputs on lines 104 will control the manipulatable variables, but these manipulatable variables can have the settings thereof measured and output on lines 110. A plurality of measured disturbance variables (DVs), are provided on line 112 (it is noted that there are unmeasurable disturbance variables, such as the fuel composition, and measurable disturbance variables such as ambient temperature. The measurable disturbance variables are what make up the DV vector on line 112). Variations in both the measurable and unmeasurable disturbance variables associated with the operation of the plant cause slow variations in the amount of NOx emissions and constitute disturbances to the trained model, i.e., the model may not account for them during the training, although measured DVs may be used as input to the model, but these disturbances do exist within the training data set that is utilized to train in a neural network model.

The measured NOx output and the MVs and DVs are input to a controller 116 which also provides an optimizer operation. This is utilized in a feedback mode, in one embodiment, to receive various desired values and then to optimize the operation of the plant by predicting a future control input value MV(t+1) that will change the values of the manipulatable variables. This optimization is performed in view of various constraints such that the desired value can be achieved through the use of the neural network model. The measured NOx is utilized typically as a bias adjust such that the prediction provided by the neural network can be compared to the actual measured value to determine if there is any error between the prediction provided by the neural network. This will be described in more detail herein below. Also, as will be described herein below, the neural network contained in the controller provides a model of the NOx that represents the operation of the plant/system 102. However, this neural network must be trained on a historical data set, which may be somewhat sparse. Since the operation of the plant/system 102 is subject to various time varying disturbances that are unmeasurable, the neural network is trained, as will be described herein below, to account for these time varying disturbances such that these disturbances will be rejected (or accounted for) in the training and, thus, in the prediction from one time period to the next.

Figure 2:
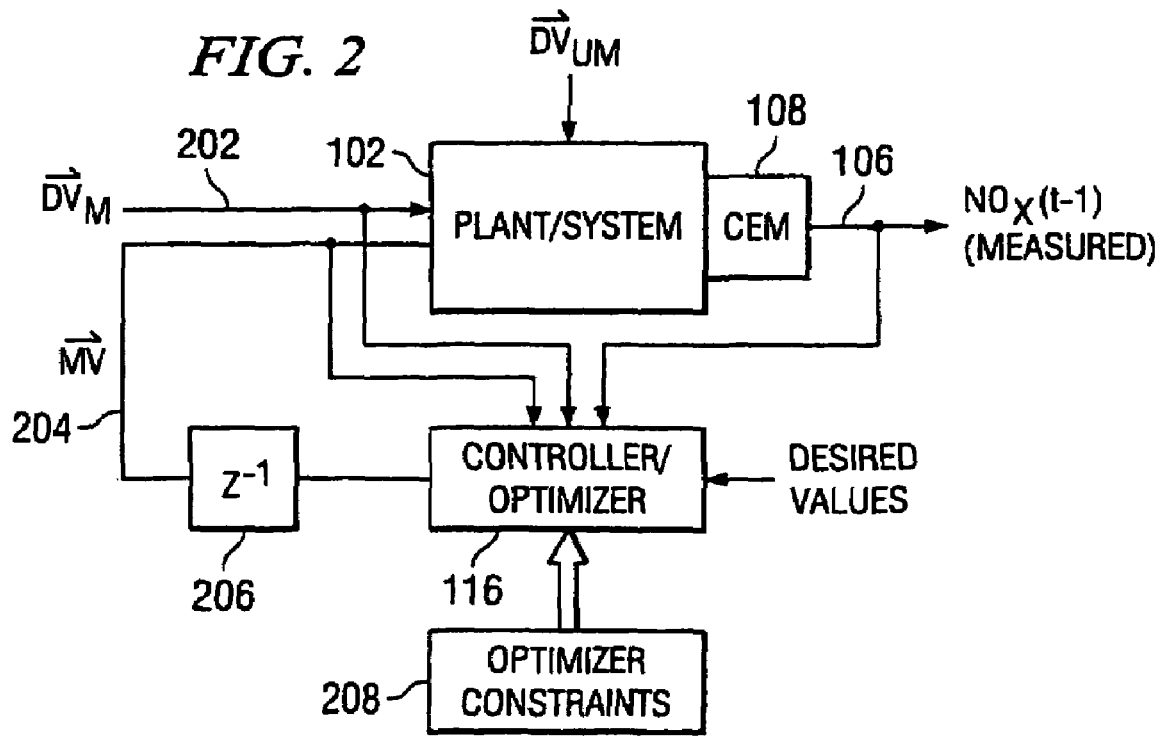
FIG. 2 illustrates a detail of the operation of the plant and the controller/optimizer.

Referring now to FIG. 2, there is illustrated a more detailed diagram of the system of FIG. 1. The plant/system 102 is operable to receive the DVs and MVs on the lines 202 and 204, respectively. Note that the DVs can, in some cases, be measured ($DV_M$), such that they can be provided as inputs, such as is the case with temperature, and in some cases, they are unmeasurable variables ($DV_{UM}$), such as the composition of the fuel. Therefore, there will be a number of DVs that affect the plant/system during operation which cannot be input to the controller/optimizer 116 during the optimization operation. The controller/optimizer 116 is configured in a feedback operation wherein it will receive the various inputs at time "t−1" and it will predict the values for the MVs at a future time "t" which is represented by the delay box 206. When a desired value is input to the controller/optimizer, the controller/optimizer will utilize the various inputs at time "t−1" in order to determine a current setting or current predicted value for NOx at time "t" and will compare that predicted value to the actual measured value to determine a bias adjust. The controller/optimizer 116 will then iteratively vary the values of the MVs, predict the change in NOx, which is bias adjusted by the measured value and compared to the predicted value in light of the adjusted MVs to a desired value and then optimize the operation such that the new predicted value for the change in NOx compared to the desired change in NOx will be minimized. For example, suppose that the value of NOx was desired to be lowered by 2%. The controller/optimizer 116 would iteratively optimize the MVs until the predicted change is substantially equal to the desired change and then these predicted MVs would be applied to the input of the plant/system 102.

Figure 3:
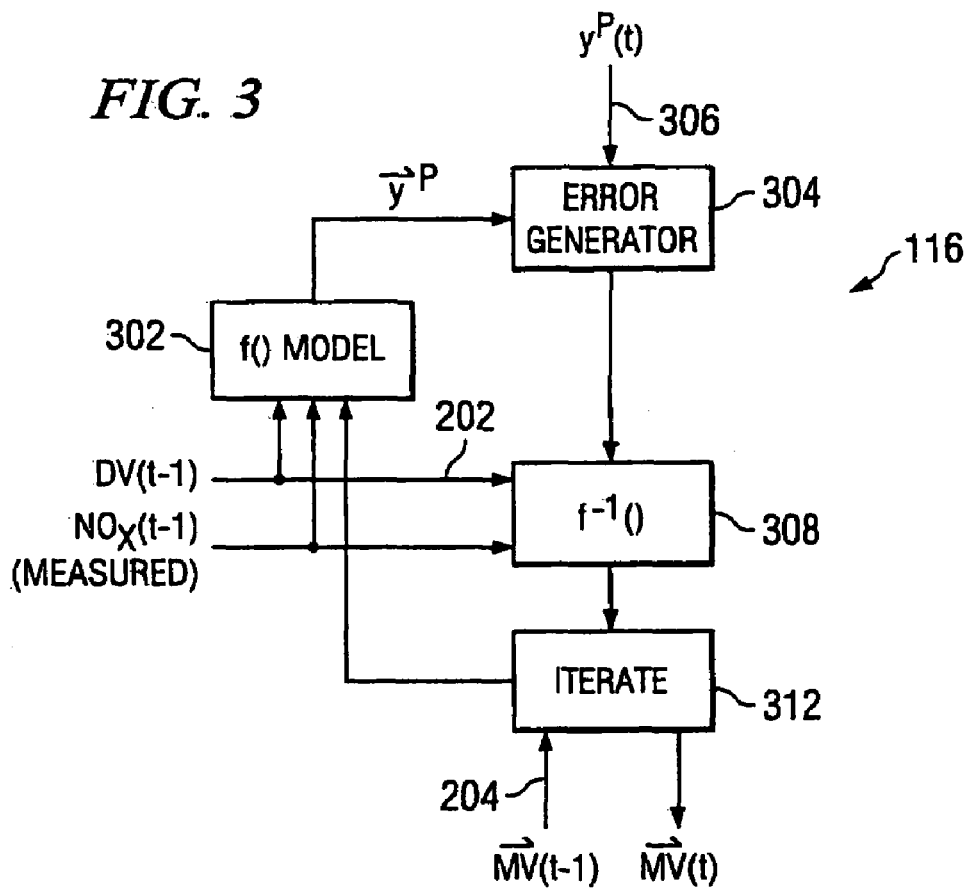
FIG. 3 illustrates a detail of the controller/optimizer.

Referring now to FIG. 3, there is illustrated a block diagram of the controller/optimizer 116. The output from the plant 102, the measured DVs on line 202 and the MVs on line 204 are input to the controller/optimizer. A neural network or nonlinear model 302 is provided that receives as inputs the DVs, the measured NOx, and the MVs, at time "t−1," which values at time "t−1" are held constant, and outputs a predicted value of NOx associated therewith, set forth as the output of vector $y^p$. The model 302 is a learned nonlinear representation of the plant/system 102 in the presence of unmeasurable time varying disturbances and is defined by the function f( ), and it is trained in view of these disturbances to allow for rejection thereof, as will be described in more detail herein below. The output of model 302 is input to an error generator block 304, which is operable to also receive a desired value on input 306. The error generator 304 determines an error between the predicted value and the desired value in this instantiation (where an optimized is often utilized), this error then being back propagated through an inverse model 308. As described herein below, the desired value is a change in the NOx value over the measured value at time "t."

The inverse model provides a function $f^1($ $)$ which is identical to the neural network representing the plant predicted model 302, with the exception that it is operated by back propagating the error through the original plant model with the weights of the predictive model frozen. This back propagation of the error through the network is similar to an inversion of the network with the output of the model 308 representing the value in $\Delta MV(t+1)$ utilized in a gradient descent operation which is illustrated by an iterate block 312. In operation, the value of $\Delta MV(t+1)$ is added initially to the input value MV (t) and this sum is then processed through the predictive model 302 to provide a new predicted output $y^p(t)$ and a new error. This iteration continues until the error is reduced below a predetermined value within the defined optimization constraints. The final value is then output as the new predicted control vector MV(t+1).

Figure 4A:
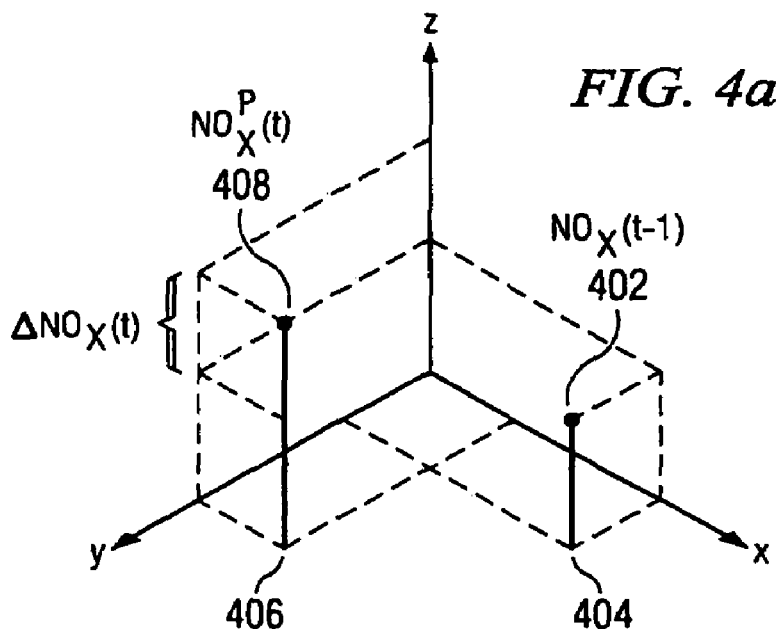
FIGS. 4a–4c illustrate diagrammatic views of the NOx prediction.
Figure 4B:
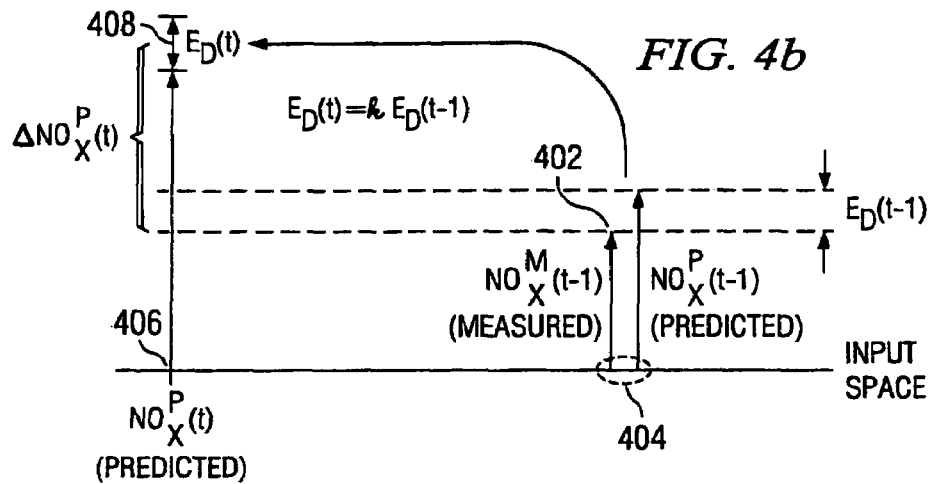
Figure 4C:
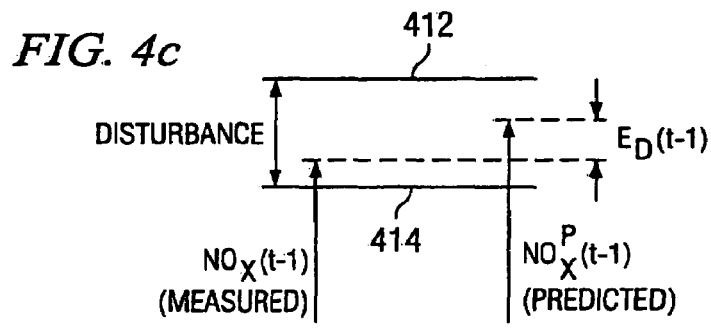

Referring now to FIGS. 4a–4c, there are illustrated diagrammatic views of the input space and output space and the predictions therein. With specific reference to FIG. 4a, the input space is illustrated in a two-dimensional plane "x" and "y." The output, the NOx value, is illustrated in the z-plane. The initial or measured value of NOx is defined at a point 402 for an x, y value at a point 404 in the x-y plane. As the input variables change, i.e., the x, y values, this will change to an x, y value at a point 406 in the x-y plane. This will constitute a different position within the input space. It can be seen that, since the measured value of NOx at time "t" is known, all that is required is to predict the change in NOx from time "t" to time "t+1." The future value at the x, y value at point 406 will result in an NOx value at 408 with the difference between the value at point 404 and 408 being $\Delta NOx(t+1)$. It is this $\Delta NOx(t+1)$ value that is predicted by the network, as opposed to predicting the absolute value of the NOx at point 408 with no knowledge of the actual measured value at time "t−1." Further, the prediction takes into account a forward projection from time "t−1" to time "t" of the error in the prediction due to disturbance discounted by a disturbance variable "k."

In FIG. 4a, even though the point 404 and the point 406 are disposed at different positions within the input space, this is for illustrative purposes only. Since the point 404 in the input space and the point 406 in the input space are separated by one increment of time, that being the time between pattern measurements, typically one hour, it could be that the points 404 and 406 are much closer within the input space but, as will be described herein below, there is a time varying disturbance that might cause a change in the actual prediction at time "t" as compared to time "t−1" even for the same settings of the MVs.

Referring now to FIG. 4b, there is illustrated a diagrammatic view in the z-plane of the two points in time, at point 404 and at point 406. At point 404, there are illustrated two output values. The first is the measured output value $NOx^m(t-1)$ which is basically the output of the CEM 108 on line 106 in FIG. 1. The other value that exists at time "t−1" is the predicted value of the trained model. This is $NOx^p(t-1)$. It can be seen that, due to the fact that there is a time varying unmeasurable disturbance, there will be an error between the predicted value and the measured value. This is referred to as $E_D(t-1)$. This is basically the unmeasurable disturbance error between the predicted value and the measured value, i.e., the error that was not rejected by the model itself. If the unmeasurable disturbance did not vary in time, then a prediction at a later time would have the same error contained therein. In that event, a standard trained neural network would only have to have a bias adjust provided to offset the value thereof by this error. However, if the error is time varying such that there may be a change in the error between the unmeasurable disturbance from one point in time to the next successive point in time, this needs to be accounted in the model such that it can be removed from the prediction. Thus, the prediction at point 406, a different point in time, at time "t," the prediction at point 408 will occur. This is the predicted output $NOx^p(t)$. Since this is a predicted value, there will be some error associated therewith that is defined as $E_D(t)$. Since there is no actual measured value at "t," it is not possible to determine what the offset is for the predictive system. Therefore, one must use the error between measured and predicted output values at time "t−1" and somehow utilize that to adjust the predicted output at time "t."

The model in the disclosed embodiment is trained on the predicted value at time "t−1," the change in NOx from "t−1" to "t" and a forward projection of the disturbance, ED, at "t−1" projected forward to time "t." This is facilitated by the following relationship:

$$E_D = k E_D(t-1) \qquad (1)$$

The value of "k" is a learned variable that provides a "discount" of the error measured at time "t−1" to that embedded within the training of the model at time "t" such that this discounted error can be added to prediction at time "t." If the disturbance did not change, the value of k=1 would exist and, if the disturbance was rapidly changing, the value of k=0 would exist. For slow moving time varying disturbances, the value of k would be between the value of "0" and "1."

Referring now to FIG. 4c, there is illustrated a higher level of detail for the difference between the predicted value at "t−1" and the measured value at "t−1." It is noted that the disturbance range is illustrated between two lines 412 and 414, this being the amount that the unmeasurable disturbance can vary over time. The actual difference between the predicted NOx value and measured output NOx value at time "t−1" represents the estimation of the disturbance at time "t−1."

Figure 5:
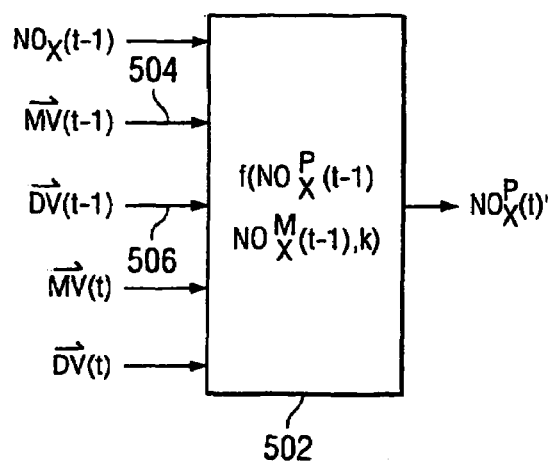
FIG. 5 illustrates a block diagram of the neural net model for modeling the NOx.

The illustration of FIG. 4 is further illustrated in the diagrammatic view of FIG. 5 wherein a model 502 of the predicted NOx value with disturbance rejection (NOx$^P$(t)') is illustrated that receives as inputs the values of MV(t−1) and DV(t−1) on lines 504 and 506, respectively, and the new values of MV(t) and DV(t) for the prediction of NOx$^P$(t)' at time "t.". It also receives the measured value of NOx at time "t." The model 502 is a model that is parameterized on the value of the prediction at time "t−1," NOx(t−1), the value of the change from time "t" to "t−1" and the forward projection of the disturbance error determined to exist between the predicted and measured values at time "t−1" as follows:

$$NOx^P(t)'=f(NOx^P(t-1), NOx^m(t-1), \Delta NOx^P(t)) \quad (2)$$

where

NOx$^P$(t−1) is the predicted value of NOx at time "t−1," and

NOx$^m$(t−1) is the measured value of NOx at time "t−1," and $\Delta$NOx$^P$(t) is the predicted change in NOx from time "t−1" to time "t."

Figure 6:
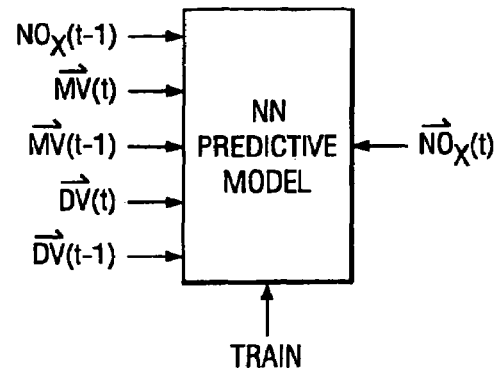
FIG. 6 illustrates a diagrammatic view of the model during training.

Referring now to FIG. 6, there is illustrated a diagrammatic view of the training operation. The training operation requires the measured values of MV and DV at time "t" and the measured values of MV, DV and NOx at "t−1." This is compared to the measured value of Nox(t) as the trained output controlled variable, such that the model is a function of the MVs and DVs at both the current predicted time "t" and for the prior predicted time "t−1" and also as a function of the NOx value at the prior predictive time "t−1." Therefore, the value of NOx at "t−1" is utilized as an input whereas the value of NOx (t) is an output in the training data set during the training operation. This data will be utilized in the predictive model for training thereof such that a representation of the change in NOx from a current measured value to a future predicted value can be determined with the error between the predicted and measured values of NOx at time "t−1" projected forward in time to time "t", this being the representation through which the input values of MV and DV are mapped at time "t."

Figure 7:
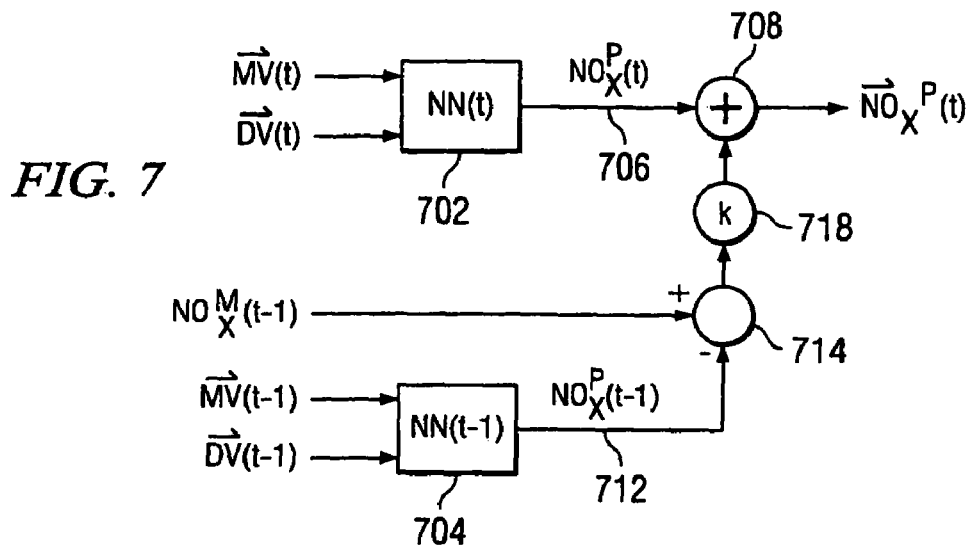
FIG. 7 illustrates a detailed view of the model as it will be used in training with both the bias adjust model and a primary model.

Referring now to FIG. 7, there is illustrated a diagrammatic view of a neural network model utilized in a feedback system. This is comprised of a first neural network model 702 that operates at time "t" and the same neural network model, a model 704, that operates at time "t−1." The neural network model 702 receives as inputs MV(t) and DV(t) at time "t" and provides a predicted output therefrom of NOx$^P$(t) on an output 706. This is input to a summing junction 708 that is operable to receive a bias adjust value. The model 704 is a bias adjust model that provides a forward projection of the disturbance at time "t−1" as a bias adjust. Generally, these are steady state models and the time for the plant/system 102 (such as a boiler) to settle is approximately one hour. Therefore, the samples that are utilized for bias adjusting are the MVs and DVs that existed one hour prior in time which were the subject of a prior measurement and a prediction of NOx$^P$(t−1) on an output 712 from the model 704. The output of the model 704 is an input to a subtraction circuit 714 to determine the difference between the measured value of NOx$^m$ at "t−1," and provides as the output thereof the difference there between, this being the disturbance error value E$_D$(t−1). If the prediction at "t−1" was accurate and there were no unaccounted for disturbance, this value will be "0." This is then input to bias adjust block 718 to provide a disturbance variable k (0≤k≤1.0). If the value of k is "0," then the model is not bias adjusted. This provides from the output of the summing block 708 the projected disturbance error E$_D$(t) at time "t." As will be described herein below, each of the models 702 and 704 are trained on the data such that they will reject the disturbances in the prediction space.

Figure 8:
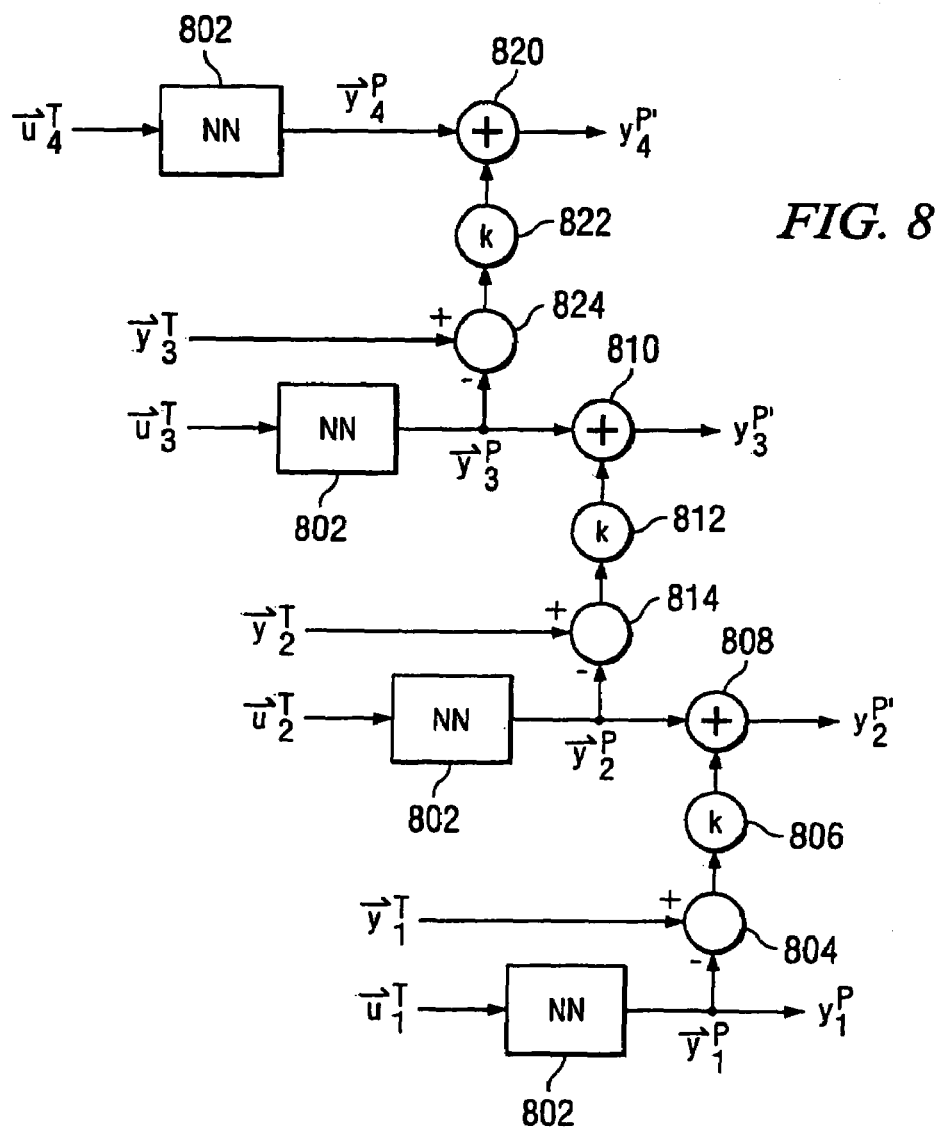
FIG. 8 illustrates a diagrammatic view of a portion of the training algorithm utilizing the forward propagation through the neural networks.

In order to train the neural network illustrated in FIG. 6, it is necessary to utilize a chaining technique. This is graphically illustrated in FIG. 8. In FIG. 8, the chaining is an iterative process. For notation purposes, the inputs MV(t) and DV(t) will be represented by the input vector u(t) and the output NOx will be represented by a vector y(t). The first step is to process each of the patterns in a historical data set through the model, this being represented by a steady state neural network model 802. However, it should be understood that any nonlinear model can be utilized. For a given time, there is provided a vector of values (u$^T$(t), (y)$^T$(t)), wherein u$^T$(t) constitutes the input vector (MVs and DVs) and y$^T$(t) constitutes the output vector of the measured data. The superscript "T" indicates that this is part of the training data. Therefore, the training data will be comprised of the sample vectors, u$_1^T$, u$_2^T$, ..., u$^T$(t), ..., u$_T^T$, for each sample pattern and the output vector would comprise y$_1^T$, y$_2^T$, ..., y(t)$^T$, ..., y$_T^T$. This constitutes the measured input and output data of the plant. When the input vector u$_1^T$ is processed through the neural network, this will result in a predicted output vector y$_1^P$. For processing the next input pattern comprised of the input vector u$_2^T$, it is input to the neural network 802, the output providing the predicted vector y$_2^P$. This is then bias adjusted by taking the difference between the output of the neural network 802 for the predictive value y$_1^P$ with a difference block 804 with the other input connected to the measured value of y$_1^T$. This effectively determines how good the prediction is. This error in the prediction is then processed through a bias adjust coefficient block 806 to adjust the difference by the bias adjust coefficient k. The output of this is input to a summing block 808. The summing block 808 sums the bias adjusted output of the block 806 with the predicted value y$_2^P$ to provide the adjusted value y$_2^{P'}$.

For the next pattern, that associated with (u$_3^T$, y$_3^T$), the vector u$_3^T$ is processed through the neural network 802 to provide the predicted output value y$_3^P$ which is input to a summing block 810. The summing block 810 receives a value from the output of a bias adjust block 812, which receives an error value from the output of the difference block 814 which determines the difference between the output of the neural network 802 associated with the input vector u$_2^T$, the predicted value y$_2^P$, and y$_2^T$. This provides in the output of the summing block 810 the adjusted value y$_3^{P'}$. This continues on for another illustrated pattern, the pattern (u$_4^T$, y$_4^T$) wherein the input vector u$_4^T$ is input to the neural network 802 to provide the predicted value y$_4^P$ for input to a summing block 820, which is summed with the output of a bias adjust block 822, which receives an error value from a difference block 824, which is the difference between the previous measured value of y$_3^T$ and y$_2^T$, which has the predicted value y$_3^P$ output by the network 804 associated with the input vector u$_3^T$. The summing block 820 provides the output y$_4^{P'}$. This process basically requires that the first pattern be processed in a defined sequence before the later patterns, such that the results can be used in a chaining operation. For each pattern at time "t," there will be a prediction y$^P$(t), which will then be error adjusted by the projected disturbance error from the pattern at time "t−1" to provide an error corrected prediction y$^P$(t)' which projected error is the difference between the prediction y$^P$(t−1) and the measured value y$^T$(t−1) from the training data set. This will be defined as follows:

$$\vec{y}^P(t)' = \vec{y}^P(t) + E_D(t) \quad (3)$$

$$E_D(t) = k(\vec{y}^P(t-1) - \vec{y}^T(t-1)) \quad (4)$$

Thus, it can be seen that each forward prediction is parameterized by the error due to disturbances of the last pattern in time, which last pattern in time is one that comprises the input vectors and output vectors in the historical data set that were gathered one time increment prior to the current input and output vectors. It is noted that the patterns are gathered on somewhat of a periodic basis—approximately one hour in the present disclosed embodiment. If there is a large gap of time that separates the data collection, then this is accounted for, as will be described herein below. Thus, each forward prediction $y^P(t)'$ is offset by a forward projection of the error between the prediction relative to the prior pattern in time and the error between such prediction and the measured value of y(t) for that prior pattern in time discounted by the disturbance coefficient k. This prediction $y^P(t)'$ is then used for the determination of an error to be used in a back propagation or steepest descent learning step, as will be described herein below.

Referring now to FIG. 9, there is illustrated the next step in the training algorithm. After the forward prediction has been made and the value of $y^P(t)'$ determined for each pattern in the historical training data set, then the difference between the predicted value $y^P(t)'$ and the value of the output vector y(t) in the historical training data set for each pattern are propagated back through the network to determine an error in the weights. This proceeds in a chaining method by taking the higher value pattern, i.e., the most recent pattern, and subtracting the predicted value output by the associated one of the summing blocks 808, 810, 820 in this example, and back propagating it through the model with a bias adjust. In this example of FIG. 9, the highest predicted value from the forward prediction described herein above with respect to FIG. 8, $y_4^{P'}$ for the fourth pattern, is subtracted from the measured value in the historical training data set for that associated pattern, $y_4^T$. This is back propagated through the network 802 at time "4" to provide the error $dE_4/dw$. The next pattern $y_3^T$ then has the value previously determined predicted value for the third pattern $y_3^{P'}$ output by the summing block 810 in FIG. 8 subtracted therefrom. This is input to one input of a difference block 902 which has the value $y_4^T - y_4^{P'}$ multiplied by the adjust disturbance coefficient k in a bias adjust block 904 subtracted therefrom. This is input to neural network 802 at time "3" and back propagated therethrough to determine the error in the weights for that pattern $dE_3/dw$. The next pattern $y_2^T$ then has the value $y_2^{P'}$ output by the summing block 808 subtracted therefrom. This is input to one input of a difference block 908 which has the value $y_3^T - y_3^{P'}$ multiplied by the disturbance coefficient k in a bias adjust block 910 subtracted therefrom. This is input to neural network 802 and back propagated therethrough to determine the error in the weights for that pattern $dE_2/dw$. This generally is the technique for updating the weights utilizing a steepest descent method. The last coefficient of the first pattern in this example, has the difference between $y_1^T - y_1^{P'}$ determined and then input to a difference block 916 to determine the difference between that difference and the bias adjusted value of k ($y_2^T - y_2^{P'}$), the output of a difference block 916 input to the neural network 802 for back propagation therethrough to determine the error with respect to the weights, $dE_1/dw$. It can be seen that for each pattern, the reverse operation through the network utilizes back propagation of the difference between the predicted value for the input vector associated with that pattern mapped through the network for a given value of k, and the corresponding output vector for that pattern parameterized by the difference for the "t+1" pattern discounted by the distribution coefficient k.

The weights of the network may be adjusted using any gradient based technique. To illustrate, the update of the weights after determination of dE/dw for each pattern is done with the following equation:

$$w(t+1) = w(t) - u * d\vec{E}/dw \quad (5)$$

where:

$$d\vec{E}/dw = dE_4/dw + dE_3/dw + dE/dw + dE_1/dw \quad (6)$$

Additionally, even though the weights have been determined, the disturbance coefficients k can also be considered to be a weight and they can be trained. The training algorithm would be as follows:

$$k_{t+1} = k_t - \mu dE/dk \quad (7)$$

Referring now to FIG. 10, there is illustrated a time line that illustrates the manner in which the samples are taken. Typically, an engineer can only take so many samples. The set of samples for the historical data set must be taken at a steady state condition of the plant/system 102. Typically, whenever the MVs are changed, then the system has to stabilize for about an hour. Therefore, an engineer may be able to take eight or ten patterns, one hour apart, in a day. However, after the last pattern, the engineer may leave for the evening and come back the next day and take another eight or ten patterns. Therefore, there must be some accounting for the time between the last pattern of one day and the first pattern of the next day. To facilitate this, a flag is set to "0" for the first pattern, such that the "t−1" pattern that is utilized for the first "t" training pattern will be the prior one to the most recent. Therefore, the first pattern, ($u_1^T$, $y_1^T$) will have the value of flag set equal to "0." This is illustrated in the table of FIG. 11. Therefore, the first training pattern is thrown out in the back propagation algorithm.

The above described training of a non linear model for the purpose of rejecting the slow varying disturbances that exist during the operation of the plant will be described herein below as to the details of the training algorithm.

Training Algorithm

FIGS. 8 and 9 are a diagrammatic representation of the training algorithm and the following will be a discussion of the mathematical representation. However, from a notation standpoint, the following will serve as definitions:

y(t) is the output vector in the historical data set;
u(t) is the input vector in the historical data set, comprised of the MVs and DVs;
F(u(t)) is the model function;
$y^P(t)$ is the predicted output vector from the model;
$y^{P'}(t)$ is the predicted output vector with an accounting for the unmeasurable disturbances; and
$\bar{\epsilon}(t)$ is the error due to disturbance.

Because F(u(t)) may be nonlinear, either a feedforward neural network (NN) approach or a support vector machine (SVM) approach could be taken for developing the model. Although both NN and SVM approaches can be used for the nonlinear model, in this embodiment of the disclosure, the NN approach is presented. The NN approach yields a simple solution which provides for easy implementation of the algorithm. In addition, it is shown that the disturbance coefficient k can be easily identified in conjunction with the NN model. However, a linear network could also be trained in the manner described hereinbelow.

Using a neural network for the nonlinear model, the optimal prediction is given by:

$$\vec{y}^{P'}(t) = NN(\vec{u}(t), w) + k(\vec{y}(t-1) - NN\vec{u}(t-1), w)) \quad (9)$$

where NN(•) is the neural network model and w represents the weights of the model. This equation 9 represents the forward prediction in time of the network of FIG. 7. Given a data set containing a time series of measured output data, $y_1, \ldots, y_t, \ldots y_T$, and input data, $u_0, \ldots, u_t, \ldots u_{T-1}$, (T being the final time in the data set) a feedforward neural network and disturbance model can be identified by minimizing the following error across a training set:

$$E = \frac{1}{2}\lambda\|w\|^2 + \sum_{t=2}^{T}(\vec{y}^{P'}(t) - \vec{y}^{P}(t))^2 \quad (10)$$

where $y^{P'}(t)$ is given by Equation 9 and $\lambda$ is a regularization coefficient. (The first prediction occurs at time t=2 because the optimal estimator needs at least one measurement of the output.) Because of the small amount of data typically collected from the plant, a regularization approach that relies upon cross-validation to select the coefficient, $\lambda$, has been used.

Gradient based optimization techniques can be used to solve for the parameters of the model, although other optimization techniques could be utilized equally as well. Using this approach, in the disclosed embodiment, the gradient of the error with respect to the weights and disturbance coefficient must be calculated. Given 10, the gradient of the error with respect to the weights is given by:

$$\frac{\partial E}{\partial w} = \frac{1}{2}\lambda\frac{\partial\|w\|^2}{\partial w} + \sum_{t=2}^{T}\frac{1}{2}\frac{\partial(\vec{y}^{P'}(t) - \vec{y}(t))^2}{\partial w} \quad (11)$$

$$= \frac{1}{2}\lambda\frac{\partial w^T w}{\partial w} + \sum_{t=2}^{T}(\vec{y}^{P'}(t) - \vec{y}(t))\frac{\partial \vec{y}^{P'}(t)}{\partial w} \quad (12)$$

$$= \lambda w + \sum_{t=2}^{T}\bar{\varepsilon}(t)\frac{\partial \vec{y}^{P'}(t)}{\partial w} \quad (13)$$

where $\bar{\epsilon} = y^{P'}(t) - y(t)$. Using Equation 9, $\partial y^{P'}(t)/\partial w$ is given by:

$$\frac{\partial \vec{y}^{P'}(t)}{\partial w} = \frac{\partial NN(\vec{u}(t), w)}{\partial w} - k\frac{\partial NN(\vec{u}(t-1), w)}{\partial w} \quad (15)$$

Substituting this result into Equation 12 yields, $$\frac{\partial E}{\partial w} = \lambda w + \sum_{t=2}^{T}\bar{\varepsilon}(t)\left(\frac{\partial NN(\vec{u}(t), w)}{\partial w} - k\frac{\partial NN(\vec{u}(t-1), w)}{\partial w}\right) \quad (16)$$

$$= \lambda w + \sum_{t=2}^{T}\bar{\varepsilon}(t)\frac{\partial NN(\vec{u}(t), w)}{\partial w} - k\sum_{T=2}^{T}\bar{\varepsilon}(t)\frac{\partial NN(\vec{u}(t-1), w)}{\partial w} \quad (17)$$

A more convenient form of the derivative can be derived by substituting t=t'+1 into the second summation, $$\frac{\partial E}{\partial w} = \lambda w + \sum_{t=2}^{T}\bar{\varepsilon}(t)\frac{\partial NN(\vec{u}(t), w)}{\partial w} - k\sum_{t'=1}^{T-1}\bar{\varepsilon}(t'+1)\frac{\partial NN(\vec{u}(t'), w)}{\partial w} \quad (18)$$

$$= \lambda w + \sum_{t=2}^{T-1}\bar{\varepsilon}_t\frac{\partial NN(\vec{u}(t), w)}{\partial w} - k\sum_{t'=2}^{T-1}\bar{\varepsilon}(t'+1)\frac{\partial NN(\vec{u}(t'), w)}{\partial w} \quad (19)$$

$$+ \bar{\varepsilon}_T\frac{\partial NN(\vec{u}(T-1), w)}{\partial w} - k\bar{\varepsilon}_2\frac{\partial NN(\vec{u}_0, w)}{\partial w} \quad (20)$$

By combining the two summations in the previous equation and defining $\bar{\epsilon}_{t+1} = \bar{\epsilon}_1 = 0$, the error gradient can be conveniently written as:

$$\frac{\partial E}{\partial w} = \lambda w + \sum_{t=1}^{T}(\bar{\varepsilon}(t) - k\bar{\varepsilon}(t+1))\frac{\partial NN(\vec{u}(t), w)}{\partial w} \quad (22)$$

From Equation 20, it can be observed that the gradient with respect to the weights is obtained using a modified backpropagation algorithm which maps to FIG. 9, where the error term $(\bar{\epsilon}(t) - k\bar{\epsilon}(t+1))$ is backpropagated through the network NN with $\partial NN(u(t),w)/\partial w$. In this case, the gradient at each time instance is obtained by backpropagating the model error at the current time minus k times the error at the next time instance through the network. Because only the error that is backpropagated through the network is different than that of the standard backpropagation algorithm, the calculation of this gradient is relatively straightforward to implement.

A gradient based approach is also used to derive the disturbance coefficient of the model k. The derivative of the error with respect to the disturbance coefficient is given by:

$$\frac{\partial E}{\partial k} = \frac{1}{2}\lambda\frac{\partial k^2}{\partial k} + \sum_{T=2}^{t}\frac{1}{2}\frac{\partial(\vec{y}^{P'}(t) - \vec{y}(t))^2}{\partial k} \quad (24)$$

$$= \lambda k + \sum_{t=2}^{T}(\vec{y}^{P'}(t) - \vec{y}(t))\frac{\partial \vec{y}^{P'}(t)}{\partial k} \quad (25)$$

$$= \lambda k + \sum_{t=2}^{T}\bar{\varepsilon}_t\frac{\partial \vec{y}^{P'}(t)}{\partial k} \quad (26)$$

Using Equation 9, $\partial \bar{y}_t/\partial k$ is given by:

$$\frac{\partial \vec{y}^{p\prime}(t)}{\partial k} = \vec{y}(t-1) - NN(\vec{u}(t-1), w) \quad (28)$$

$$= -\varepsilon(t-1) \quad (29)$$

where $\epsilon_t = NN(\vec{u}(t),w) - \vec{y}(t)$. Substituting this result into Equation 23 gives, $$\frac{\partial E}{\partial k} = \lambda k + \sum_{t=2}^{T} -\bar{\varepsilon}(t)\varepsilon(t-1) \quad (31)$$

Review of the Training Algorithm

Using a gradient based approach to determining the parameters of the model, the following three steps are used to update the model at each training epoch:

1. Forward Iteration of the Model: A forward propagation of the model across the time series, from (t=2) to (t=T) is performed using the following equation:

$$\vec{y}^{P\prime}(t) = NN(\vec{u}(t,w) + k(\vec{y}(t-1) - NN(\vec{u}(t-1),w)). \quad (32)$$

2. Modified Backpropagation: The derivative of the error with respect to the weights and disturbance coefficient are computed using:

$$\frac{\partial E}{\partial w} = \sum_{t=1}^{T} (\bar{\varepsilon}(t) - k\bar{\varepsilon}(t+1))\frac{\partial NN(\vec{u}(t), w)}{\partial w} \quad (33)$$

$$\frac{\partial E}{\partial k} = \sum_{t=2}^{T} -\bar{\varepsilon}(t)\varepsilon(t-1) \quad (34)$$

$$\bar{\varepsilon}(t) = \vec{y}^{p\prime}(t) - y(t) \quad (35)$$

$$\varepsilon(t) = NN(\vec{u}(t), \vec{y}(t)) - \vec{y}(t) \quad (36)$$

where $\bar{\epsilon}(T+1) = \bar{\epsilon}_1 = 0$. The derivative of the error with respect to weights can be implemented by backpropagating $(\bar{\epsilon}(t) - k\bar{\epsilon}(t+1))$ through the neural network at each time interval from 2 to T-1. At time T, $\bar{\epsilon}_T$, is backpropagated through the network while at time 1, $-k\bar{\epsilon}_2$, is backpropagated.

3. Model Parameter Update: Finally, the weights are updated using steepest descent or other gradient based weight learning algorithms. To guarantee stability of the time series model, it is advisable to constrain the disturbance coefficient k to be less than 1.0.

Given the nonlinear steady state model, NN(u(t), w), the coefficient of the disturbance model, k, and the current measurement of the output (NOx), y(t), the optimal prediction of the new steady state value of NOx, y(t+1) due to a change in the inputs to the furnace, u(t), is $$\vec{y}^{P\prime}(t) = NN(\vec{u}(t),w) + k(\vec{y}(t) - NN(\vec{u}(t-1),w)). \quad (41)$$

Using this equation, optimization techniques, such as model predictive control, can be used to determine set points for the inputs of the furnace, $u_t$, that will minimize the level of NOx formation while observing other process constraints such as limits on carbon monoxide production.

Figure 12:
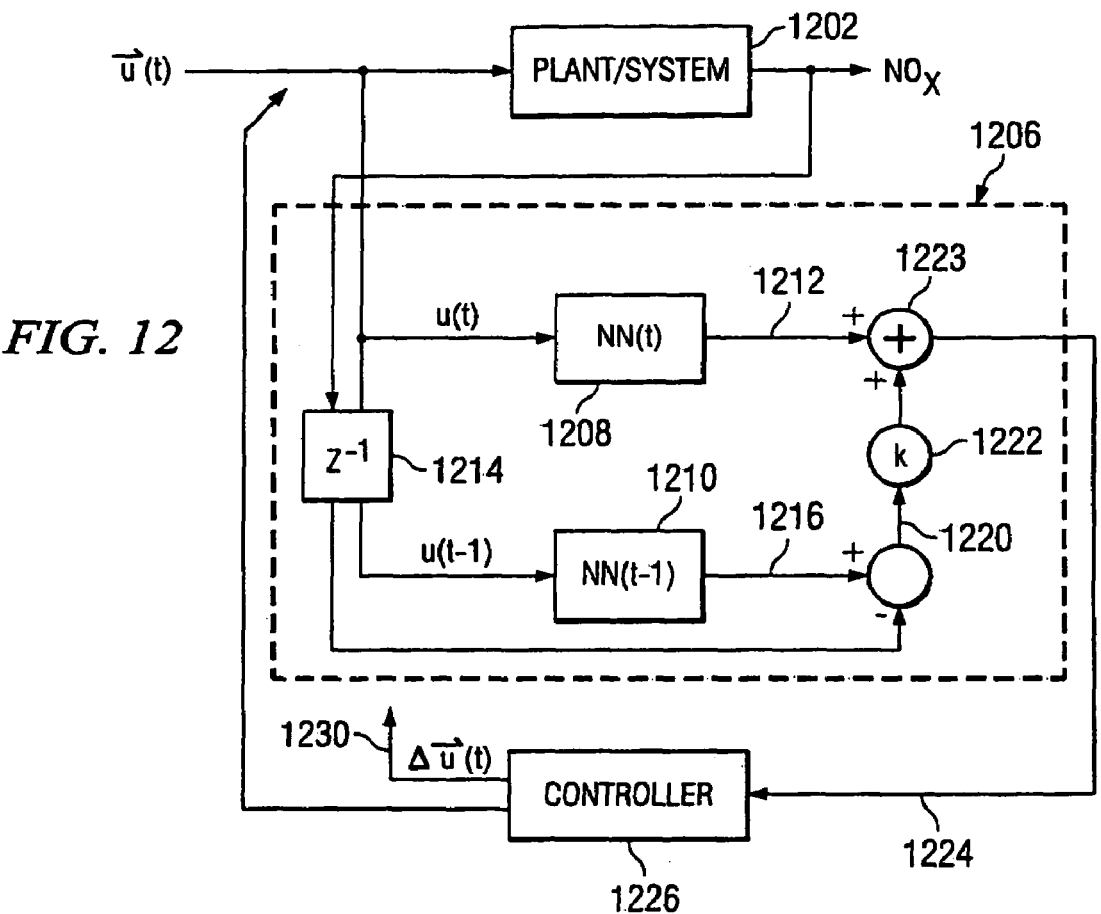
FIG. 12 illustrates a diagrammatic view of the trained neural network utilized in a feedback system.

Referring now to FIG. 12, there is illustrated a diagrammatic view of the training model of the present disclosure utilized in a feedback loop, i.e., with an optimizer. The plant/system 1202 receives on the input an input vector u(t) that is comprised, as described herein above, of manipulatable variables and disturbance variables. Of these, some can be measured, such as the measurable MVs and the measurable DVs. These are input to the nonlinear predictive model 1206 that is basically the model of FIG. 7. This model 1206 includes two nonlinear neural network models 1208 and 1210. It should be understood that both of the models 1208 and 1210 are identical models. In fact, the operation basically utilizes a single network model that it multiplexed in operation. However, for illustrative purposes, two separate models 1208 and 1210 are illustrated. In fact, two separate models could be utilized to increase processing speed, or a single multiplexed model can be utilized. Thus, when referring to first and second models, this will reflect either individual models or a multiplexed model, it just being recognized that models 1208 and 1210 are identical.

Model 1208 is a model that is utilized to predict a future value. It will receive the input u(t) as an input set of vectors that will require a prediction on an output 1212. A delay block 1214 is operable to provide previously measured values as a input vector u(t-1). Essentially, at the time the prediction is made, these constitute the measured MVs and DVs of the system. The optimizer will freeze these during a prediction. This input vector u(t-1) is input to the neural network model 1210 which then generates a prediction on an output 1216 of the predicted value of NOx, $NOx^p(t-1)$. The output of the model 1210 on line 1216 is then subtracted from the measured value of NOx at "t-1" to generate a disturbance error on a line 1220, which is then multiplied by the disturbance coefficient k in a block 1222. This provides a discounted disturbance error to a summing block 1223 for summing with the output of neural network 1208 on line 1212. This disturbance error provides the error adjusted prediction on an output 1224 for input to the controller 1226. The controller 1226, as described herein above, is an optimizer that is operable to iteratively vary the manipulatable portion of the input vector u(t) (the MVs) with the values of u(t-1), and NOx(t-1) held constant. The model 1206 is manipulated by controlling this value of the manipulatable portion of u(t), (MV(t)), on a line 1230 from the controller 1226. Once a value of u(t) is determined that meets with the constraints of the optimization algorithm in the controller 1226, then the new determined value of u(t) is input to the plant/system 1202. Thus, it can be seen that the trained neural network 1206 of the present disclosure that provides for disturbance rejection is used in a feedback mode for the purpose of controlling the plant/system 1202. This is accomplished, as described herein above by using a predictive network that is trained on a forward projection of the change in the output controlled variable (CV) of NOx in this example from time "t-1" to time "t" for a change in the MVs from the measurement of a current point at time "t-1" and, thus, will provide a stored representation of such. Additionally, the network is trained on a forward projection of the change in the unmeasurable disturbances from time "t-1" to time "t" for a change in the MVs from the measurement of a current point at time "t-1" and, thus, will provide a stored representation of such.

Figure 13:
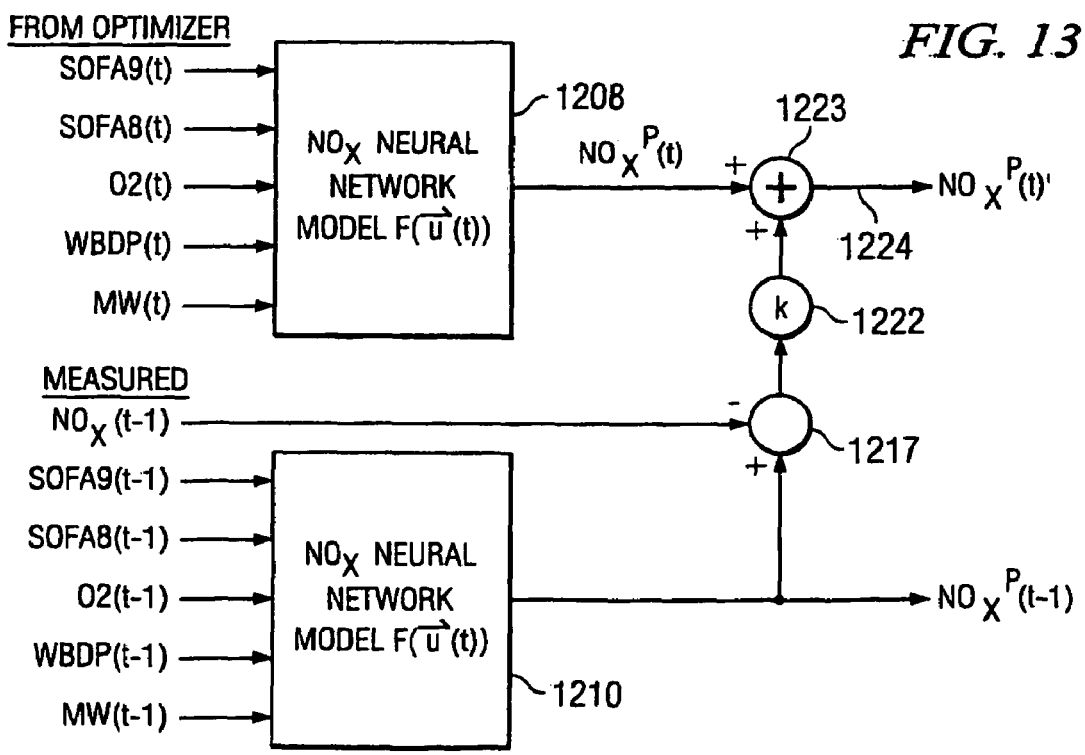
FIG. 13 illustrates a more detailed diagram of the network utilized in a feedback system.

Referring now to FIG. 13, there is illustrated a more detailed diagrammatic view of the operation of the neural network models 1208 and 1210 in an actual operation of a boiler. The network 1208 is operable to receive the predicted values at time "t" for separated overfire air on an input SOFA9(t), there being also another similar input SOFA8 (t) that is input thereto. Predicted Oxygen, O2(t), in addition to other predicted values, WBDP (t) and MW (t) are provided at time t." All these inputs are future predicted inputs that will be determined by the optimizer or controller 1226. The measured inputs to the network 1210 comprise the same inputs except they are the measured inputs from time "t−1." The network 1210 outputs the predicted value $NOx^P(t-1)$ which is input to the subtraction block 1217. This output is then multiplied by the disturbance coefficient and added to the output of network model 1208 to provide the predicted output with disturbance rejection.

Although the predictive network has been described as using a non linear neural network, it should be understood that a linear network would work as well and would be trained in substantially the same manner as the non linear network. It would then provide a stored representation of a forward projection of the change in the output controlled variable (CV) of NOx in this example from time "t−1" to time "t" for a change in the MVs from the measurement of a current point at time "t−1." Additionally, the linear network can be trained to provide a stored representation of a forward projection of the change in the unmeasurable disturbances from time "t−1" to time "t" for a change in the MVs from the measurement of a current point at time "t−1."

Although the preferred embodiment has been described in detail, it should be understood that various changes, substitutions and alterations can be made therein without departing from the spirit and scope of the invention as defined by the appended claims.

What is claimed is:

1. A controller for controlling operation of a system that receives a plurality of measurable inputs, a portion of which are manipulatable, and generates an output, the controller comprising:
    a predictive network for predicting the change in the output at a future time"t" from time "t−1" for a change in the measurable inputs from time"t−1" to time"t" by mapping an input value through a stored representation of a change in the output at a future time"t" from time"t−1" for a change in the measurable inputs from time"t1" to time "t,"
    an optimizer for receiving a desired value of the output and utilizing the predictive network to predict the change in the output for a given change in the manipulatable portion of the measurable inputs and iteratively changing the manipulatable portion of the measurable inputs to the predictive network and comparing the predicted output therefrom to the desired value until the difference there between is within predetermined limits to define updated values for the manipulatable portion of the measurable inputs; and
    applying the determined updated values for the manipulatable portion of the measurable inputs to the input of the system.

2. The controller of claim 1, wherein the system operates in an environment that is subject to time varying unmeasurable disturbances and said predictive network is operable to predict a forward prediction at time "t" of the change in the unmeasurable disturbances from time "t−1" for a change in the measurable inputs from time "t−1" to time "t."

3. The controller of claim 1, wherein said predictive network comprises a non linear model.

4. The controller of claim 1, wherein said predictive network comprises a linear model.

5. The controller of claim 1, wherein said predictive network: comprising:
    a first non linear model for receiving an input vector and predicting a future output value at a time "t,"
    a second non linear model for receiving an input vector comprising a current measured value including an actual measurement of the output parameter at time "t−1" and determining a disturbance error therefor;
    said first and second non linear models having stored therein a forward projection of the change in the output parameter from time "t−1" to time "t" for a change in the input vector from the measurement of a current point at time "t−1;" and
    projecting forward the disturbance error and adjusting the output of said first non linear model thereby.

6. The controller of claim 5, wherein said disturbance error is adjusted by a disturbance coefficient prior to adjusting.

7. The controller of claim 1, wherein said predictive network comprises:
    an input layer having a plurality of inputs;
    an output layer having at least one output for providing the at least one output parameter; and
    a stored representation for mapping said input layer through to said output layer, said stored representation trained with a data set of historical data taken over time at periodic intervals and providing a mapping of said input layer to said output layer through a forward prediction at time "t" of the change in at least one output parameter of the system from time "t−1" for a change in the inputs from time "t1" to time "t."

8. The controller of claim 7, wherein the system operates in an environment that is subject to time varying unmeasurable disturbances and the stored representation is operable with the historical data set to provide a mapping of said input layer to said output layer through a forward prediction at time "t" of the change in the unmeasurable disturbances from time "t−1" for a change in the inputs from time "t−1" to time "t."

9. The controller of claim 1, wherein the system operates in an environment that is subject to time varying unmeasurable disturbances and said predictive network comprises:
    an input layer having a plurality of inputs;
    an output layer having at least one output for providing the at least one output parameter; and
    a stored representation for mapping said input layer through to said output layer, said stored representation trained with a data set of historical data taken over time at periodic intervals and providing a mapping of said input layer to said output layer through a forward prediction at time "t" of the change in the unmeasurable disturbances from time "t−1" for a change in the inputs from time "t−1" to time "*t*."

10. The controller of claim 7, wherein the stored representation is operable with the historical data set to provide a mapping of said input layer to said output layer through a forward prediction at time "t" of the change in at least one output parameter of the system from time "t−1" for a change in the inputs from time "t−1" to time "t."

* * * * *